United States Patent [19]
Johnson

[11] Patent Number: 5,127,587
[45] Date of Patent: Jul. 7, 1992

[54] KITCHEN COMPOSTER

[76] Inventor: Harold R. Johnson, 7341 Modoc St., Boise, Id. 83709

[21] Appl. No.: 699,512

[22] Filed: May 14, 1991

[51] Int. Cl.$^5$ .............................................. B02C 21/00
[52] U.S. Cl. ............................ 241/46.013; 241/46.016
[58] Field of Search ............... 241/46 R, 46 A, 29, 241/100.5, 101.2

[56] References Cited

U.S. PATENT DOCUMENTS

| | | | |
|---|---|---|---|
| 3,823,879 | 7/1974 | Johnson | 241/100.5 X |
| 4,337,901 | 7/1982 | Ogura | 241/100.5 X |
| 4,917,311 | 4/1990 | Yoshino et al. | 241/46 A |

*Primary Examiner*—Douglas D. Watts
*Attorney, Agent, or Firm*—Lee R. Schermerhorn

[57] ABSTRACT

A floor mounted de-watering spin chamber is connected with a kitchen disposer-grinder for de-watering and collecting ground food scraps that are suitable for garden composts. The spin chamber contains a perforated rotary spin basket and has a rigid lid with a rigid inlet tube insertable in a rigid body so that only one latch is necessary to hold the lid securely on the spin chamber. A diverter valve operated by a manual knob controls the discharge of water and solid material from the disposer-grinder selectively through the spin chamber or a drainpipe and the knob also controls a switch for an electric motor driving the spin basket. The drain pipe may also receive water and solid material from a second sink which is not equipped with a disposer-grinder and which material is not treated by the present apparatus, a baffle in a pipe connection fitting preventing such material from backing up into the spin chamber.

11 Claims, 4 Drawing Sheets

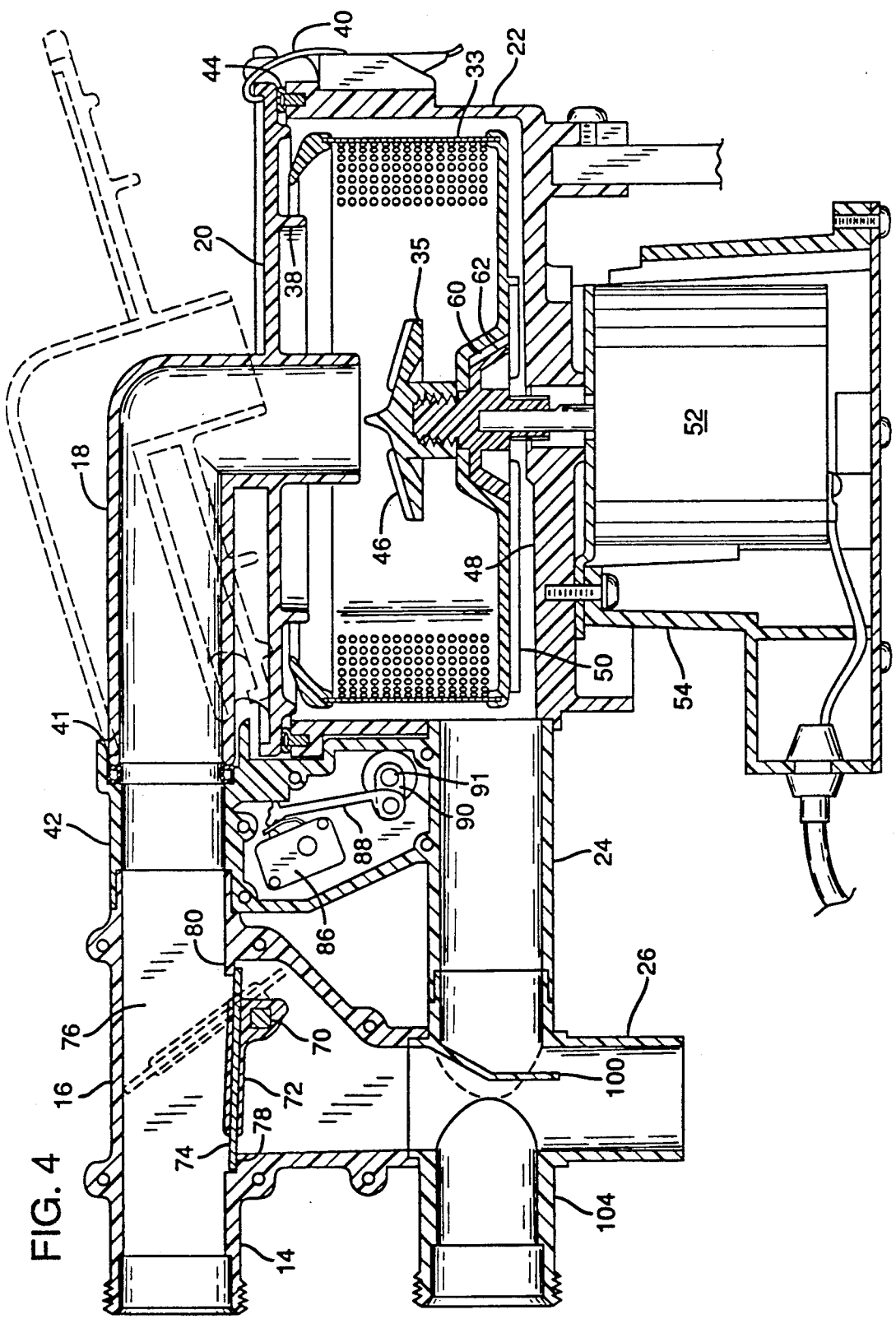

KITCHEN COMPOSTER

BACKGROUND OF THE INVENTION

This invention relates to numerous improvements in the kitchen composter in U.S. Pat. No. 3,823,879.

The composter in said patent provides apparatus for saving kitchen wastes that are suitable for compost material, the composter de-watering and collecting material discharged from a disposer-grinder on the bottom of a kitchen sink. A by-pass valve directs the discharged material into a dewatering and collecting device or into the sink drain pipe as desired. The apparatus is mounted on the door of an undersink closet adjacent the disposer grinder.

SUMMARY OF THE INVENTION

The present composter is mounted on floor supported adjustable length legs and rigidly connected with the disposer-grinder and sink drain pipe by rigid tubes. Numerous changes have been made in the spin basket unit, bypass valve, switch operation and other features of construction. Also, the present apparatus is arranged for use with a second sink not having a disposer-grinder.

The invention will be better understood and additional features and advantages will become apparent from the following description of the preferred embodiment illustrated in the accompanying drawings. Various changes may be made however in the details of construction and arrangement of parts and certain features may be used without others. All such modifications within the scope of the appended claims are included in the invention.

BRIEF DESCRIPTION OF THE DRAWINGS

FIG. 4 is a vertical sectional view of the spin chamber, diverter valve and associated connections.

DESCRIPTION OF THE PREFERRED EMBODIMENT

Figure 1:
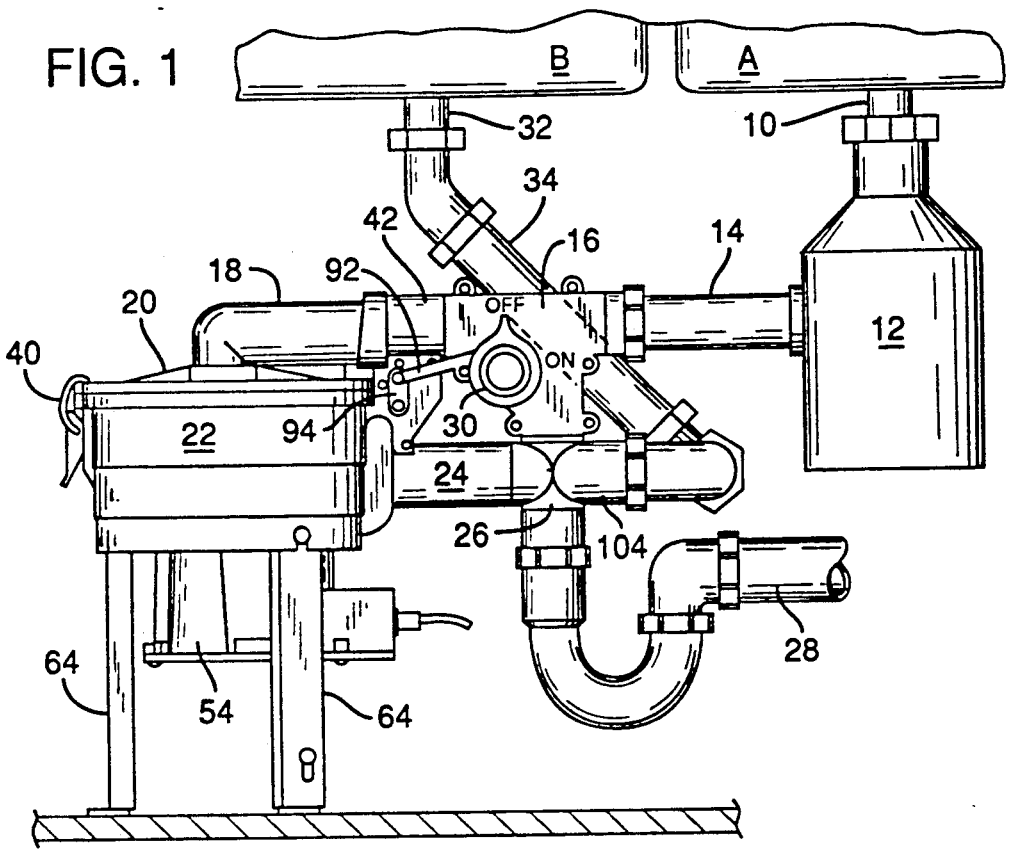
FIG. 1 is an elevation view of one side of the apparatus mounted under a pair of sinks with the upper parts of the sinks broken away.

In FIG. 1 the drain outlet connection 10 on sink A supports a conventional disposer-grinder 12 having a rigid outlet tube 14. Tube 14 discharges into a diverter valve body 16 connected to a rigid tube 18 which discharges through the center of a cover 20 on the composter spin chamber 22. Spin chamber 22 discharges through rigid tube 24 and diverter valve extension 26 to drain pipe 28.

Valve 16 has a manual control knob 30 with a normal "OFF" raised position to direct the flow from tube 14 directly through extension 26 to drain pipe 28 or, in its "ON" lower position, to divert the flow through tube 18, spin chamber 22 and extension 26 to drain pipe 28. Thus, materials not suitable for composting are not passed through spin chamber 22 but are passed directly into drain pipe 28.

Sink B is not equipped with a disposer grinder. Its drain connection 32 passes the sink drainage directly through drainage tube 34 and extension 26 to the drain pipe 28.

Figure 2:
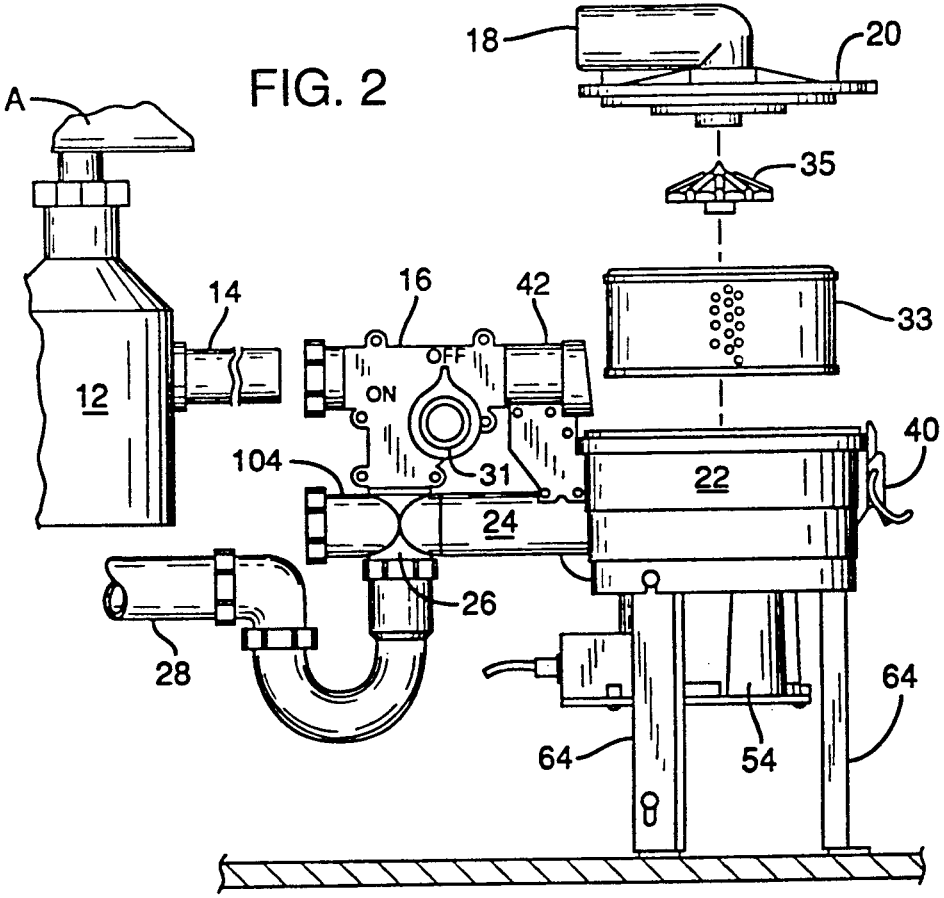
FIG. 2 is an elevation view of the opposite side of the apparatus connected to a single sink with parts broken away and parts in exploded view configuration.

FIG. 2 shows the opposite side of the apparatus in FIG. 1 with sink B omitted. Parts of the spin chamber 22 are shown in exploded view: tube 18, cover 20, spin basket 33 and spinner lock nut 35. The present composter is adapted for use with either a single or double sink installation.

Figure 3:
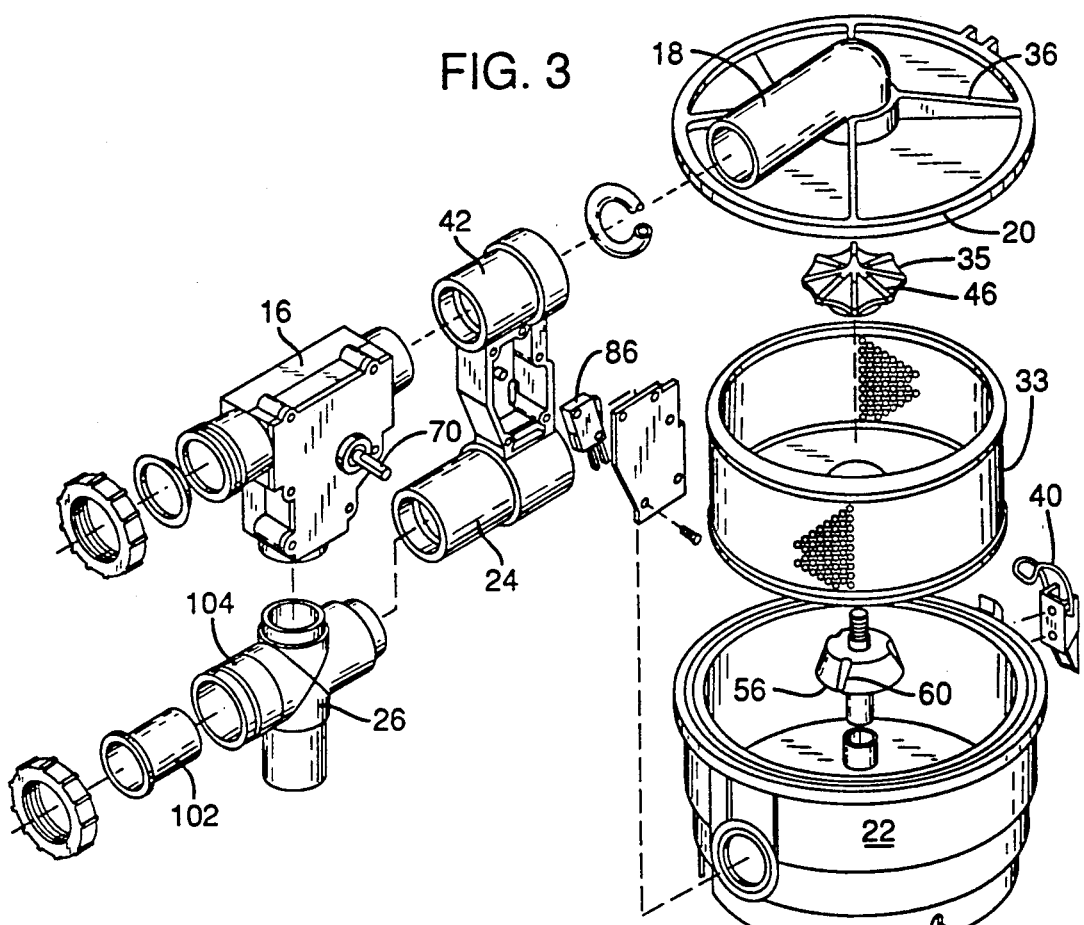
FIG. 3 is an exploded view of the composter spin chamber, diverter valve and associated parts.

Other features of the spin chamber 22 are shown in detail in FIGS. 3 and 4. Lid 20 is reinforced on its top side with radial trusses 36 and on its under side with circular protrusions 38 making the lid stiff enough to not flex and require but one latch 40. Applying pressure on the forward end of rigid tube 18 creates a fulcrum point at 41 between transition body 42 and spin chamber inlet tube 18 causing the spin chamber seal 44 to compress around 360 degrees thereby sealing the spin chamber. Tube 18 has a rigid permanent connection with lid 20.

Spinner lock nut 35 has radial ridges 46 on its top that when spinning at 1750 rmp distributes by centrifugal force the vegetable matter that comes through the tube 18 to the side wall of the perforated basket screen 33 where water is thrown off into the spin chamber. All solid material is retained in basket 33 and the plain water drained off is discharged to drain through tube 24. Bottom surface 48 of the spin chamber is inclined downward toward the entrance of tube 24 to avoid any collection of water in the spin chamber.

Three radial vanes 50 are molded in the spin basket bottom to keep the drained water agitated so that any small particles that might get through the screen will be swept to drain 24.

Spin basket 33 is rotated by electric motor 52 in motor housing 54. Basket drive 56 mounted on motor shaft 58 has radial grooves 60 receiving radial projections 62 in a recess in the bottom of the basket.

Figure 5:
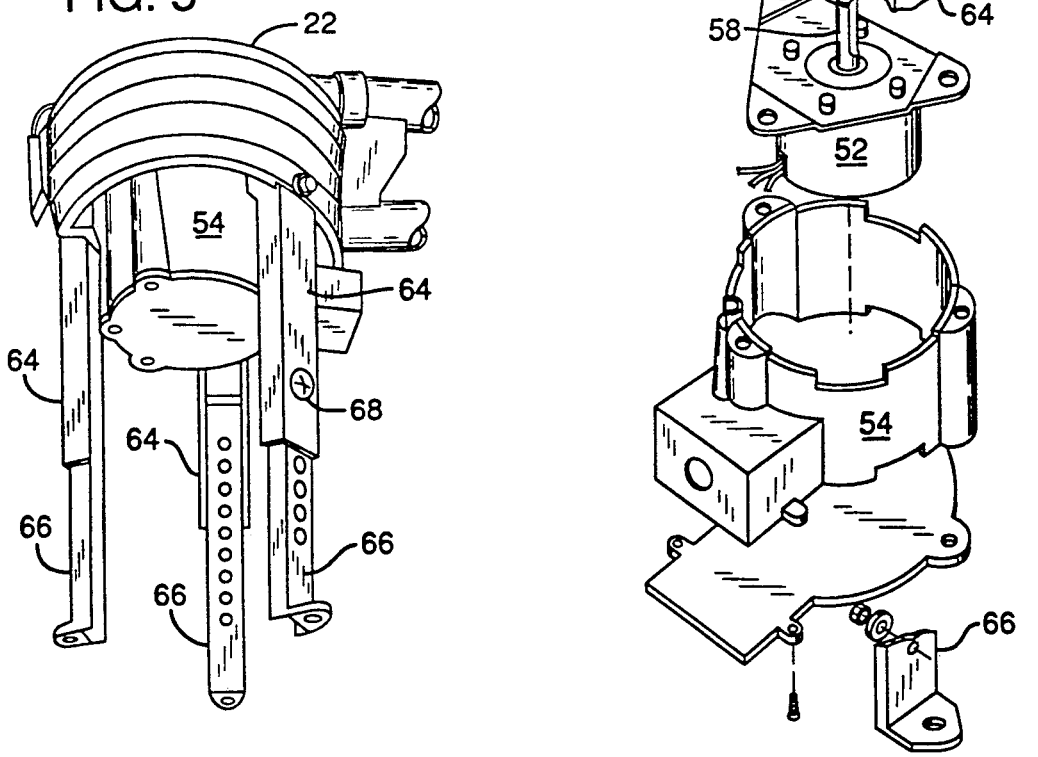
FIG. 5 is a perspective view of the composter.

The motor and spin chamber are mounted on adjustable legs as shown in FIG. 5. Three channel shaped upper legs 64 are mounted on the spin chamber and three lower legs 66 are slidable therein and secured in adjusted positions by screws 68. The lower legs have feet to be fastened to the floor.

Figure 6:
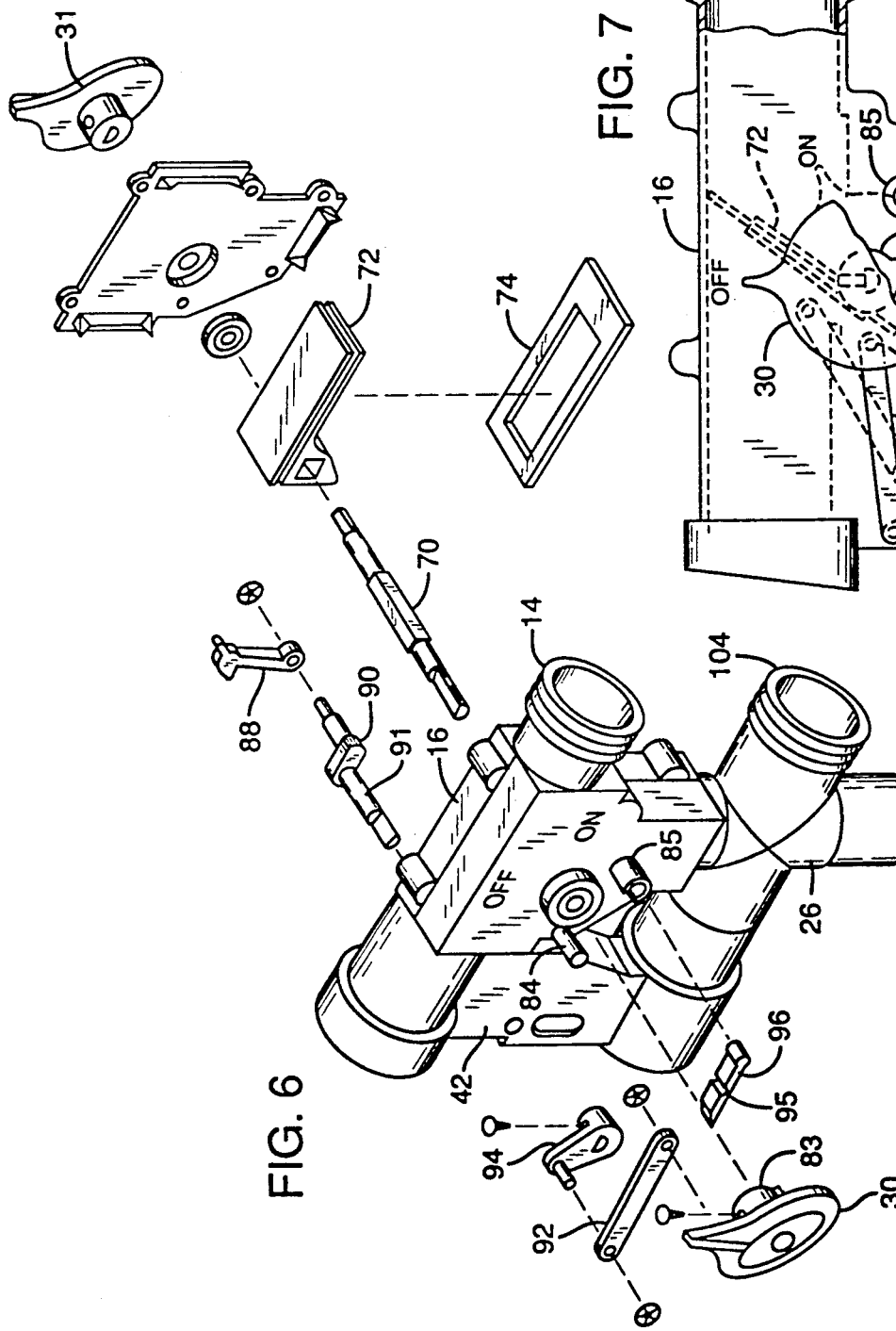
FIG. 6 is an exploded view showing the diverter valve and switch parts controlling the motor driving the spin basket.

As seen in FIG. 6 there are actuating knobs 30 and 31 on the opposite ends of shaft 70 so that diverter valve plate 72 may be manually opened and closed from opposite sides of the apparatus (see FIG. 4). Valve plate 72 is equipped with a flexible seal 74 to engage the flat top and side surfaces of rectangular valve chamber 76 in the broken line "OFF" position in FIG. 4 and to engage flat ledge surfaces 78 and 80 in the "ON" position shown in full lines in FIG. 4. In raised position the lower end of the valve member projects down through the valve port so that any moisture that gets by the valve seal will flow down the drain and not into the spin chamber.

Valve plate 72 has a loose fit on shaft 70 so that the valve member may slide from side to side allowing flexible seal 74 to clear itself from any material that may become wedged between it and the valve body wall.

Figure 7:
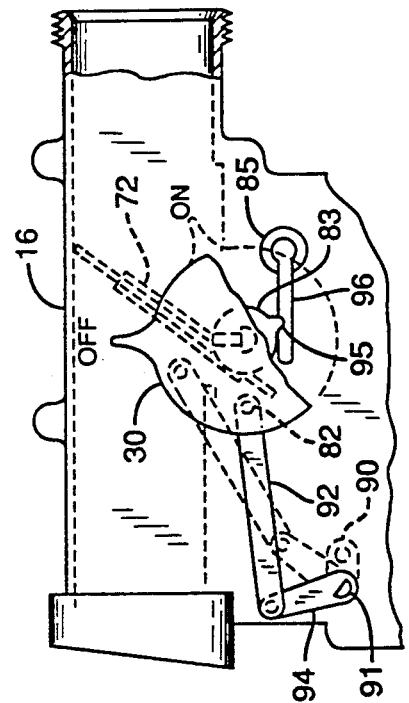
FIG. 7 is a side elevation view with parts broken away showing how one of the manual control knobs actuates the diverter valve and control switch for the spin basket motor.

Microswitch 86 in FIG. 4 is activated by slide 88 which is reciprocated by crank 90 on shaft 91. Shaft 91 is connected to boss 82 on actuating knob 30 by switch link 92 and crank 94 in FIGS. 6 and 7. A cam on knob boss 83 engages a groove 95 on spring 96 to releasably secure the diverter valve member 72 in the "OFF" position shown in broken lines in FIGS. 4 and 7. Spring 96 is mounted on post 85 on valve body 16. Stop 84 prevents the actuating knob 30 from overriding the groove in the spring 96.

In operation, when sink A in FIG. 1 contains material suitable for composting, disposer-grinder 12 is energized and valve knob 30 is turned to "ON" position placing diverter valve member 72 in its lower solid line position in FIG. 4, and closing switch 86 to energize motor 52 and rotate spin basket 33. The discharge from the disposer-grinder is thereby deposited in the spin basket and most of the water is discharged through drain tube 24.

Water from sink B passes directly through diverter valve extension 26 to drain pipe 28 bypassing the spin basket. When diverter valve member 72 is raised to its "OFF" position shown in broken lines in FIG. 4 all water and other material from sink A is also passed through diverter valve extension 26 to drain pipe 28 bypassing the spin basket.

Diverter valve extension 26 contains a baffle 100 which has three important functions. When diverter valve member 72 is in its raised position the unwanted or waste material from sink A is prevented from entering drain tube 24 from the spin chamber. Baffle 100 also prevents water or any other material from sink B from entering the spin chamber drain tube 24.

When there is only one sink as in FIG. 2, plug 102 in FIG. 3 is inserted in the second sink drain connection 104 in diverter valve extension 26 and material may accumulate therein against the plug. If the plug is removed and a second sink installed, this material is flushed out against baffle 100 and cannot enter the spin chamber.

In the present composter the principal parts are economically injection molded of fire retardent plastics.

The parts 16, 42, 22 and 26 form a unitary assembly which is useful for other purposes not involving a kitchen sink. There are other materials that would make the diverter valve necessary and important for the diverter valve and spin chamber to be used in combination. For example, the combination could be used for separating water or other liquids from seeds, small pellets etc. There may be uses too numerous to mention, for example in the pharmaceutical field.

What is claimed is:

1. Apparatus for use with a disposer-grinder connected between a sink drain and a drainpipe, said apparatus comprising a spin chamber containing a rotary de-watering spin basket, an inlet tube for said spin chamber arranged to discharge into said spin basket, a diverter valve arranged to discharge water and material from said disposer-grinder selectively though said drainpipe or through said inlet tube, and a drain tube for said spin chamber connected with said drainpipe, a rigid lid on said spin chamber, said inlet tube being a rigid tube with one end rigidly connected with the center of said lid and the opposite end detachably insertable in a transition body on said bypass valve, an inlined bottom in said spin chamber sloping downward toward the entrance of said drain tube, and radial vanes on the under surface of he bottom of said spin basket.

2. The apparatus of claim 1 including a vertical drive shaft for rotating said spin basket, a spinner lock nut on the upper end of said shaft under the discharge end of said inlet tube, and radial ridges on the top surface of said lock nut to distribute by centrifugal force material from the inlet tube against the side wall of the basket.

3. The apparatus of claim 1 including adjustable length legs for supporting the spin chamber on a floor.

4. Apparatus for use with a disposer-grinder connected between a sink drain and a drainpipe, said apparatus comprising a spin chamber containing a rotary de-watering spin basket, an inlet tube for said spin chamber arranged to discharge into said spin basket, a diverter valve arranged to discharge water and material from said disposer-grinder selectively through said drainpipe or through said inlet tube, and a drain tube for said spin chamber connected with said drainpipe, said diverter valve having a valve member mounted on a shaft with manual actuating knobs on its opposite ends for opening and closing the valve, a switch controlling a motor driving said spin basket, a slide operating said switch, a crank shaft having a first crank for reciprocating said slide and a second crank for rotating the shaft, and a link connected between said second crank and a lug on one of said actuating knobs.

5. The apparatus of claim 4 including a leaf spring mounted adjacent said one knob and having a transverse recess therein, and a cam projection on said one knob engageable in said recess to hold said knob in a valve position discharging material from said disposer-grinder through said drainpipe with said switch in open position.

6. The apparatus of claim 5, said valve member being slidable axially on its shaft.

7. The apparatus of claim 5 including a valve body having a horizontal passageway containing said valve member, said passageway leading to said spin chamber inlet tube and having a bottom discharge opening leading to said drainpipe, said valve member having an upstream edge seating on the upper surface of a valve seat on the upstream side of said bottom discharge opening and having a downstream edge seating against the under surface of a valve seat on the downstream side of said discharge opening in the lower position of said valve member, said valve member in its raised position draining any moisture thereon into said bottom discharge opening.

8. Apparatus for use with a disposer-grinder connected between a sink drain and a drainpipe, said apparatus comprising a spin chamber containing a rotary de-watering spin basket, an inlet tube for said spin chamber arranged to discharge into said spin basket, a diverter valve unit arranged to discharge water and material from said disposer-grinder selectively through said drainpipe or through said inlet tube, an extension having a top connection with said diverter valve unit and a bottom connection with said drainpipe, one side connection with a drain tube from said spin chamber, an opposite side connection with a second sink drain, and a baffle extending over the top of said spin chamber drain tube connection and between the two side connections to prevent flows from said top connection or opposite side connection from entering said one side connection with said spin chamber drain tube.

9. A spin chamber containing a rotary de-watering spin basket having a perforated side wall, a rigid lid on said spin chamber, a rigid inlet tube having one end rigidly connected with the center of said lid and the opposite end detachably insertable into a rigid body adjacent said spin chamber whereby the lid requires only one latch on the spin chamber, said latch being on the side of said spin chamber opposite said rigid body, an inclined bottom in said spin chamber sloping downward toward the entrance to a drain tube, radial vanes on the under surface of the bottom of said spin basket, a vertical drive shaft for rotating said spin basket, a spinner lock nut on the upper end of said shaft under the discharge end of said inlet tube, and radial ridges on the top surface of said lock nut to distribute by centrifugal force material from the inlet tube against the side wall of the basket.

10. The apparatus of claim 9 including a diverter valve arranged to direct a flow of liquid containing said material into either said inlet tube or a drainpipe connected with said drain tube.

11. The apparatus of claim 10 including an extension on said diverter valve having a top connection with said diverter valve, a bottom connection with said drainpipe and a side connection with said drain tube, and a baffle extending over the top of said drain tube connection and downward in spaced relation to said drain tube connection to prevent flow from said top connection from entering said drain tube.

* * * * *